May 17, 1955     W. A. KEITHLEY     2,708,449
VALVE ESCUTCHEON TUBE
Filed Oct. 1, 1951

INVENTOR
WALTER A. KEITHLEY
BY
*Mason & Graham*
ATTORNEYS

United States Patent Office 2,708,449
Patented May 17, 1955

2,708,449

VALVE ESCUTCHEON TUBE

Walter A. Keithley, Altadena, Calif., assignor of one-half to Romer Grey, Altadena, and one-third, by direct and mesne assignments, to Curtis B. Brown, Los Angeles, Calif.

Application October 1, 1951, Serial No. 249,041

3 Claims. (Cl. 137—359)

This invention relates to escutcheon members and has more particularly to do with an escutcheon peculiarly suited for valves or valve bodies and valve stems, projecting through openings in walls in building construction.

It is an object of my invention to provide an escutcheon of this type which incorporates novel means for maintaining the escutcheon centered on a valve body or the like; which may be installed and removed with maximum ease; which is economical of construction; and which may be altered in length as desired.

Further objects will appear hereinafter.

Without intending thereby to limit the broader scope of the invention, except as will appear from the appended claims, I shall now describe a presently preferred embodiment of the invention, for which purpose I shall refer to the accompanying drawings wherein:

Figure 1:
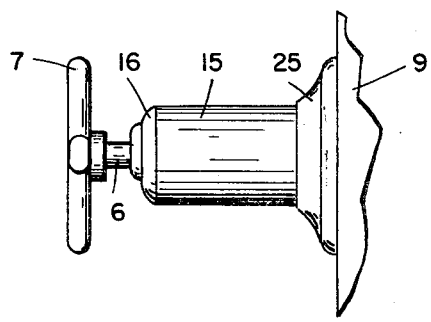
Fig. 1 is a side elevation of my escutcheon mounted upon a valve.
Figure 2:
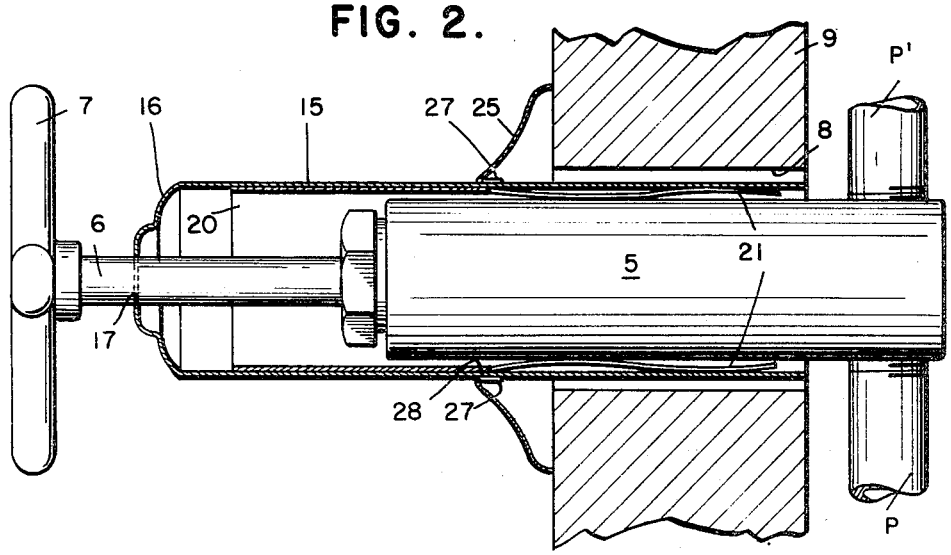
Fig. 2 is an enlarged longitudinal section showing my escutcheon mounted upon a valve.
Figure 3:
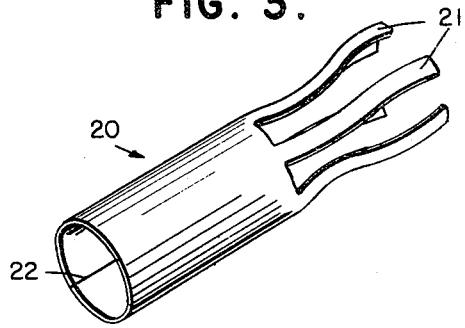
Fig. 3 is a perspective of the integral spring and sleeve element.
Figure 4:
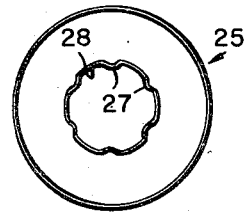
Fig. 4 is an inside elevational view of the flange element.

Referring now to the drawings, I show at 5 a conventional valve body communicating with inlet and outlet pipes P and P' respectively. A conventional valve stem 6 projects from the front end of the valve body and carries an operating wheel 7 in the usual manner. The valve body is disposed within a relatively large opening 8 in a building wall 9.

The escutcheon of my invention consists of a tubular body 15 which is cylindrical except for its front end 16 which curves to a reduced axial opening 17 to pass the valve stem. The body 15 is of larger internal diameter than the external diameter of the valve body.

Fitted in the body 15, I provide a longitudinally split resilient sleeve 20 whose outer end portion terminates in sinuous leaf springs 21 preformed to resiliently bear in opposition against the valve body and the inner surface of the escutcheon body. It is my preference to form leaf springs 21 integral with the sleeve, and the sleeve, being longitudinally split, as shown at 22, may be compressed and inserted in various sizes of tubes.

An annular flange 25 is slidably fitted on the body 15 to slide longitudinally thereof, being yieldably retained in any desired position of adjustment in the body by means of resilient ears 27 formed integral with the flange and preformed to be disposed inwardly from the plane of the inside surface of the axial opening 28 in the flange. Thus it is possible to adjust the flange along the body.

It will be apparent that my escutcheon may be adapted to fit various situations, such as different sizes and lengths of valves, and may be adapted to various wall changes, such as additions to the thickness of the wall by addition of plaster to the wall.

I claim:

1. An escutcheon device comprising, in combination with a plumbing fitting, a tubular body mounted over said fitting and having an internal diameter larger than the external diameter of said fitting, said body having an inwardly disposed annular front end flange portion defining an axial opening of substantially the same diameter as the external diameter of the portion of said fitting which extends therethrough whereby to maintain said front end portion of said body concentric with said fitting, the rear end portion of said body being unobstructed, and means for maintaining said rear end portion of said body substantially concentric with said fitting, comprising a separate spring member slidably interposed between and resiliently bearing against the inner periphery of said rear end portions of said body and the outer periphery of said fitting.

2. The device of claim 1 wherein said spring member comprises a split sleeve presenting sinuous resilient portions.

3. The device of claim 1 wherein said spring member comprises a split sleeve terminating at one end in sinuous resilient leaves extending longitudinally of said fitting and spaced apart circumferentially thereof.

References Cited in the file of this patent

UNITED STATES PATENTS

| | | |
|---|---|---|
| 196,465 | Lienau | Oct. 23, 1877 |
| 999,332 | Mueller | Aug. 1, 1911 |
| 1,080,520 | Schuermann | Dec. 2, 1913 |
| 1,516,594 | Fischer | Nov. 25, 1924 |
| 1,847,917 | Binns | Mar. 1, 1932 |